United States Patent
Watanabe et al.

(10) Patent No.: US 10,551,726 B2
(45) Date of Patent: Feb. 4, 2020

(54) LIGHTING APPARATUS

(71) Applicant: MAXELL, LTD., Kyoto (JP)

(72) Inventors: Katsuyuki Watanabe, Kyoto (JP); Takatsugu Kawabata, Kyoto (JP); Nobuyuki Kaku, Kyoto (JP); Shinji Shibuya, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/085,514

(22) PCT Filed: Mar. 17, 2016

(86) PCT No.: PCT/JP2016/058511
§ 371 (c)(1),
(2) Date: Sep. 14, 2018

(87) PCT Pub. No.: WO2017/158789
PCT Pub. Date: Sep. 21, 2017

(65) Prior Publication Data
US 2019/0079374 A1    Mar. 14, 2019

(51) Int. Cl.
*G03B 21/16* (2006.01)
*F21V 29/67* (2015.01)
(Continued)

(52) U.S. Cl.
CPC .............. *G03B 21/16* (2013.01); *F21V 29/67* (2015.01); *F21V 29/677* (2015.01);
(Continued)

(58) Field of Classification Search
None
See application file for complete search history.

(56) References Cited

U.S. PATENT DOCUMENTS

| 9,491,423 | B2* | 11/2016 | Ko | H04N 9/3144 |
| 10,120,269 | B2* | 11/2018 | Ko | G03B 21/145 |

(Continued)

FOREIGN PATENT DOCUMENTS

| JP | 2003-016831 A | 1/2003 |
| JP | 2008-250279 A | 10/2008 |

(Continued)

OTHER PUBLICATIONS

International Search Report issued in corresponding International Patent Application No. PCT/JP2016/058511, dated Jun. 14, 2016, with English Translation.

*Primary Examiner* — Elmito Breval
(74) *Attorney, Agent, or Firm* — McDermott Will & Emery LLP

(57) ABSTRACT

A lighting apparatus which is held in a state of being suspended from a mounting bracket fixed to a ceiling surface and emits illumination light is provided, and the lighting apparatus includes: an illumination light source for generating the illumination light disposed inside a housing; a projector disposed in an inner space of the housing and configured to project an image onto a projection surface; and a lint disposed in an upper portion inside the housing, wherein an air intake and an air outlet are formed at such positions in the housing that air flow generated by the fan is sucked from a lower portion of the housing, passes upward through a vicinity of the illumination light source and the projector, and is exhausted from the upper portion of the housing.

17 Claims, 11 Drawing Sheets

Figure 1:
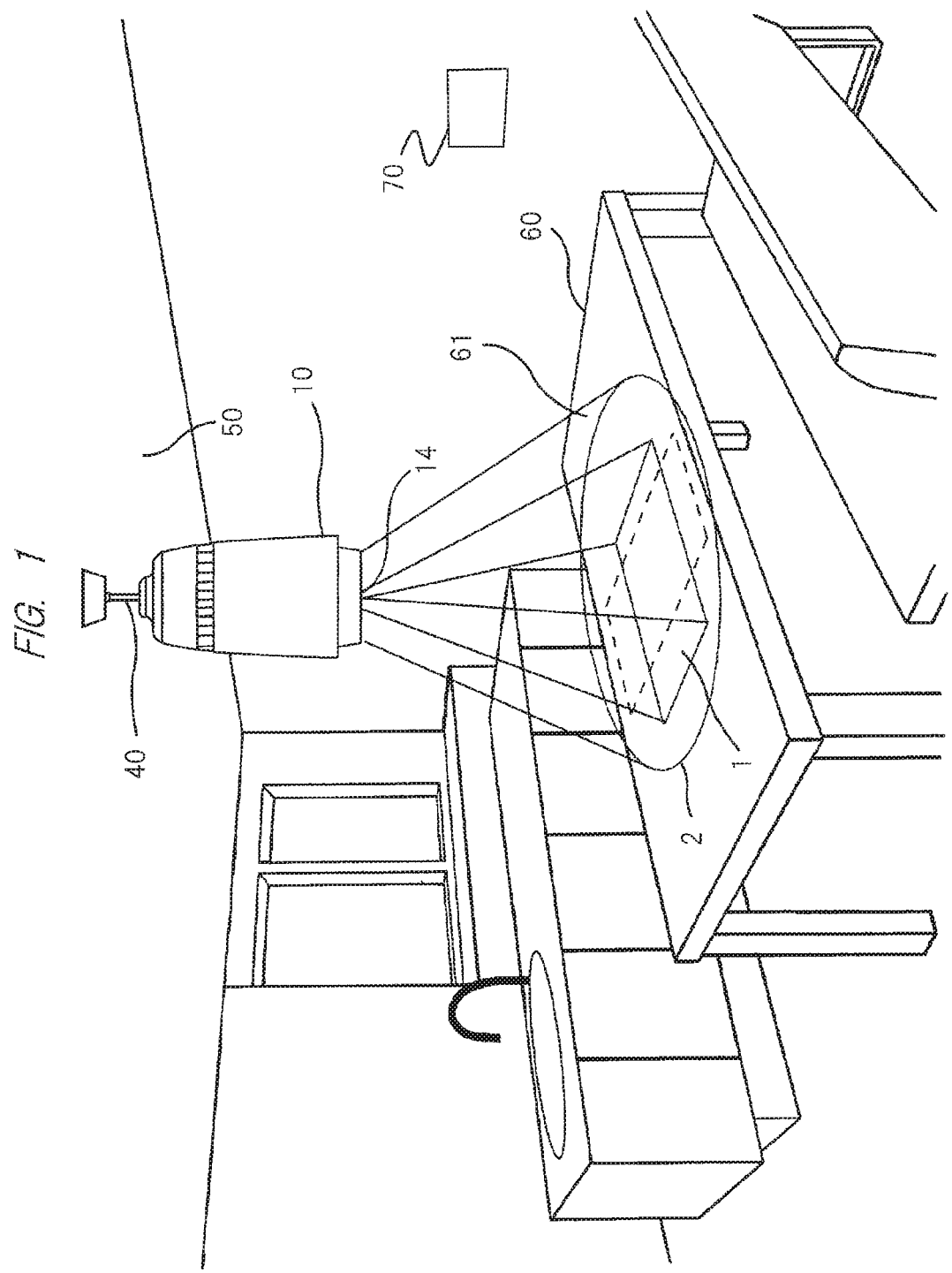

(51) Int. Cl.
*F21V 33/00* (2006.01)
*G03B 21/14* (2006.01)
*F21V 29/74* (2015.01)
*G03B 21/20* (2006.01)

(52) U.S. Cl.
CPC ........ *F21V 33/0052* (2013.01); *G03B 21/145* (2013.01); *F21V 29/74* (2015.01); *G03B 21/2033* (2013.01)

(56) References Cited

U.S. PATENT DOCUMENTS

| | | | |
|---|---|---|---|
| 2013/0207542 A1* | 8/2013 | Watanabe | F21V 29/507 315/32 |
| 2014/0098303 A1 | 4/2014 | Kasuga | |
| 2014/0119019 A1* | 5/2014 | Hsu | F21S 10/007 362/269 |
| 2014/0139812 A1 | 5/2014 | Nagatani | |
| 2016/0295177 A1* | 10/2016 | Ko | H04N 9/3144 |

FOREIGN PATENT DOCUMENTS

| | | |
|---|---|---|
| JP | 2012-186118 A | 9/2012 |
| JP | 2014-078323 A | 5/2014 |
| JP | 2014-102312 A | 6/2014 |
| JP | 2014-224887 A | 12/2014 |

\* cited by examiner

FIG. 4
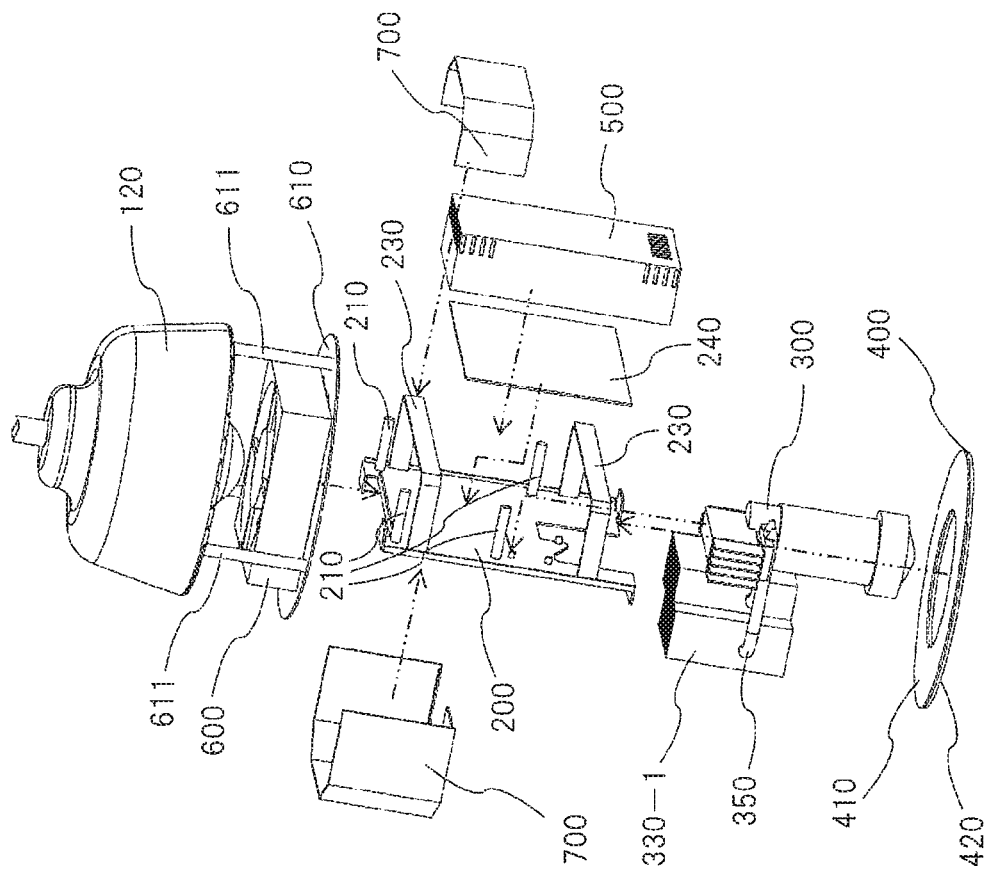
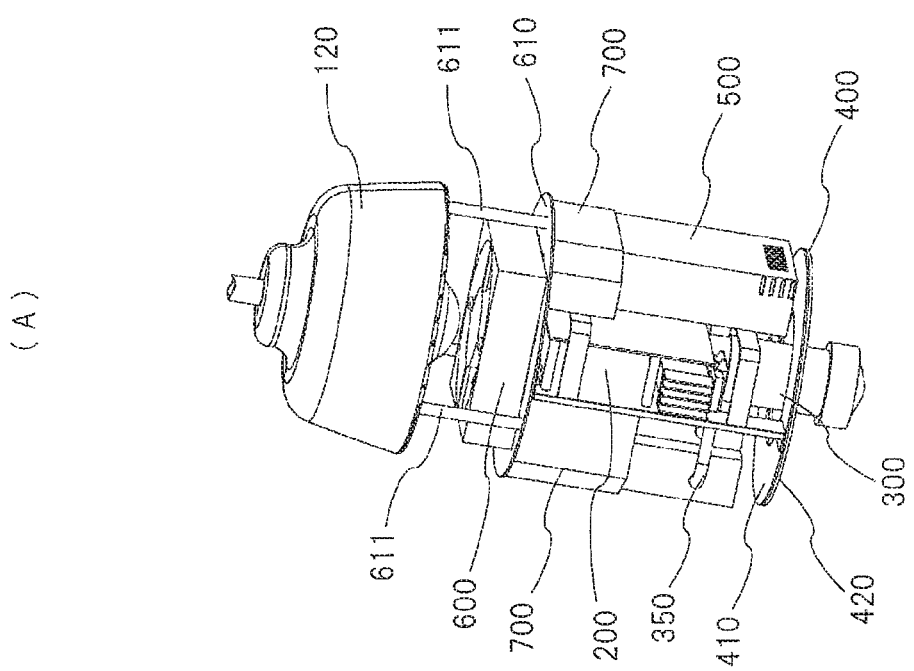

LIGHTING APPARATUS

CROSS REFERENCE

This application is the U.S. National Phase under 35 U.S.C. § 371 of International Application No. PCT/JP2016/058511, filed on Mar. 17, 2016, the entire contents is hereby incorporated by reference.

TECHNICAL FIELD

The present invention relates to a lighting apparatus.

BACKGROUND ART

Patent Document 1 listed below discloses a technique for installing a communication function module capable of utilizing various functions to a ceiling light attached to a ceiling or a wall surface.

Further, Patent Document 2 listed below discloses a lighting apparatus equipped with an image projection apparatus that enables a space production using illumination light and images in combination.

RELATED ART DOCUMENTS

Patent Documents

Patent Document 1: Japanese Patent Application Laid-open Publication No. 2003-16831
Patent Document 2: Japanese Patent Application Laid-open Publication No. 2012-186118

SUMMARY OF THE INVENTION

Problems to be Solved by the Invention

However, the prior-art techniques described above just disclose a block diagram and a simple outline of a projector, and do not disclose a lighting apparatus that takes into account the function of dissipating the heat generated from a projector, an illumination light source utilizing a semiconductor light-emitting element such as an LED, and circuit components such as an imaging device, a power source and a substrate in the lighting apparatus to outside.

Generally, a lighting apparatus having an image projecting function is attached to a ceiling surface in use, and is configured to emit illumination light from an illumination light source to, for example, a surface of a table arranged in a room and project an image light from a projector onto a desired position. Accordingly, in a main body (also referred to as a housing or shade), heat generation from the projector is expected simultaneously with heat generation from the illumination light source. In particular, when both the illumination and the projector are used together for a long period of time, the internal temperature rises due to the heat generated by the plurality of heat sources, so that the luminous efficiency and the lifetime of a light-emitting element such as the LED are reduced or the lifetime of circuit components such as the imaging device, the power source and the substrate is reduced, resulting in an adverse effect such as a deterioration of the image projected from the projector. However, in the prior-art techniques described above, sufficient consideration has not been paid to the function and structure for efficiently dissipating the heat from the plurality of heat sources in the lighting apparatus having an image projecting function to outside.

An object of the present invention is to provide a lighting apparatus having an image projecting function in which heat sources such as a light-emitting element and a projector installed inside can be more efficiently cooled.

Means for Solving the Problems

According to the present invention, a lighting apparatus which is held in a state of being suspended from a mounting bracket fixed to a ceiling surface and emits illumination light is provided, and the lighting apparatus includes: an illumination light source for generating the illumination light disposed inside a housing; a projector disposed in an inner space of the housing and configured to project an image onto a projection surface; and a fan disposed in an upper portion inside the housing, wherein an air intake and an air outlet are formed at such positions in the housing that air flow generated by the fan is sucked from a lower portion of the housing, passes upward through a vicinity of the illumination light source and the projector, and is exhausted from the upper portion of the housing.

Effects of the Invention

According to the present invention, in a lighting apparatus having an image projecting function in which a light-emitting element and a projector are installed, it is possible to efficiently dissipate heat generated from the light-emitting element and the projector to outside, and it is possible to achieve a remarkable effect of providing a lighting apparatus excellent in practical use capable of reducing an adverse effect due to heat generated from a plurality of heat sources.

BRIEF DESCRIPTIONS OF THE DRAWINGS

Figure 2:
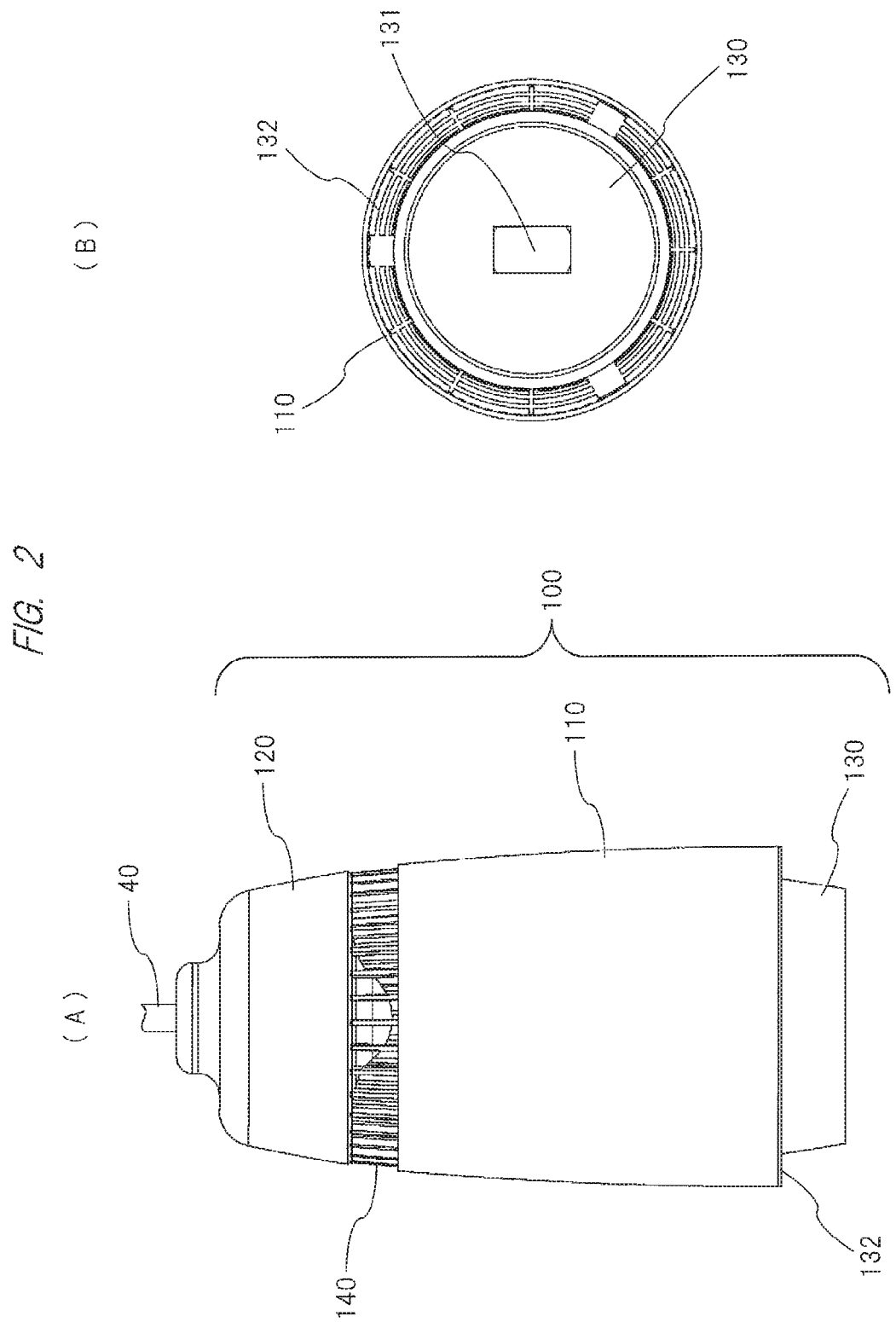
Figure 3:
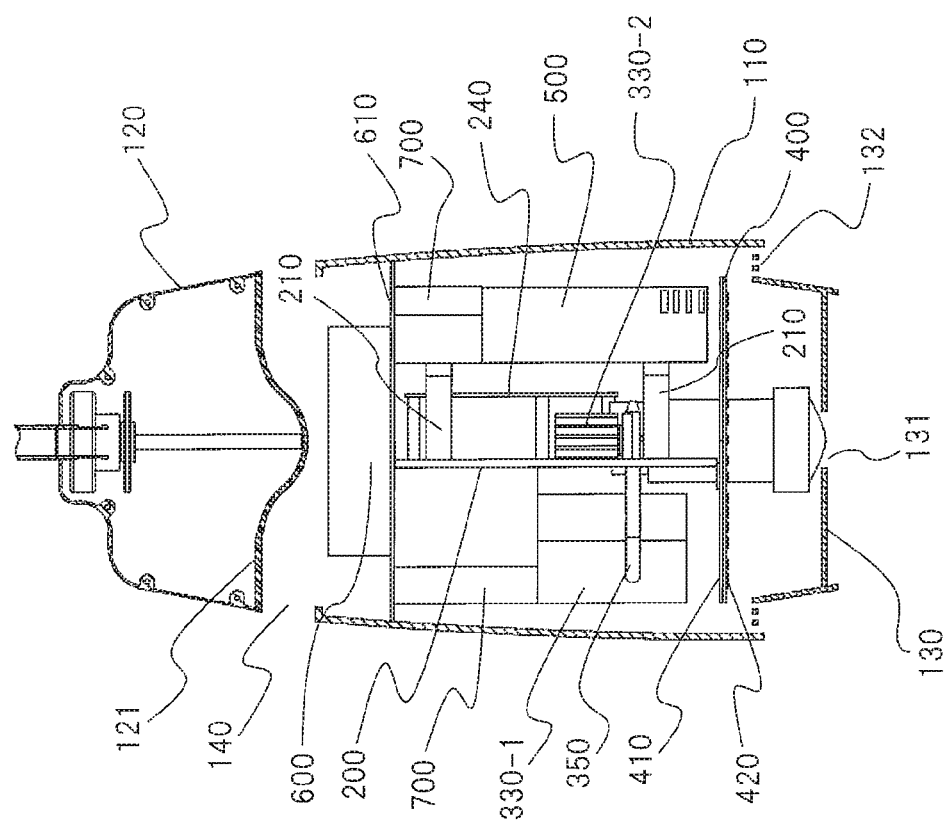
Figure 7:
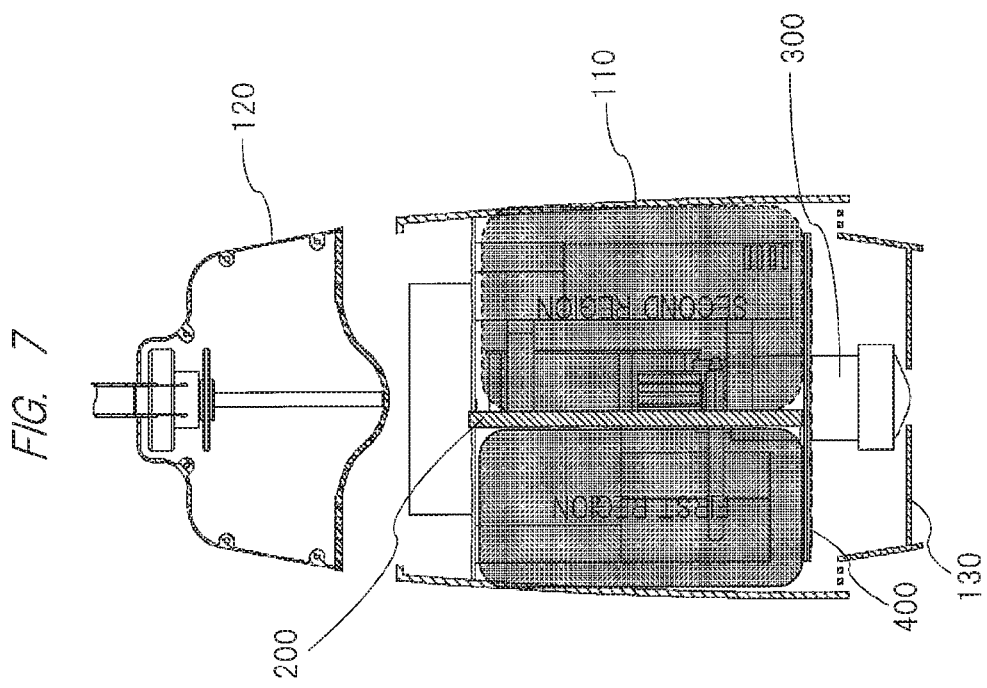
Figure 8:
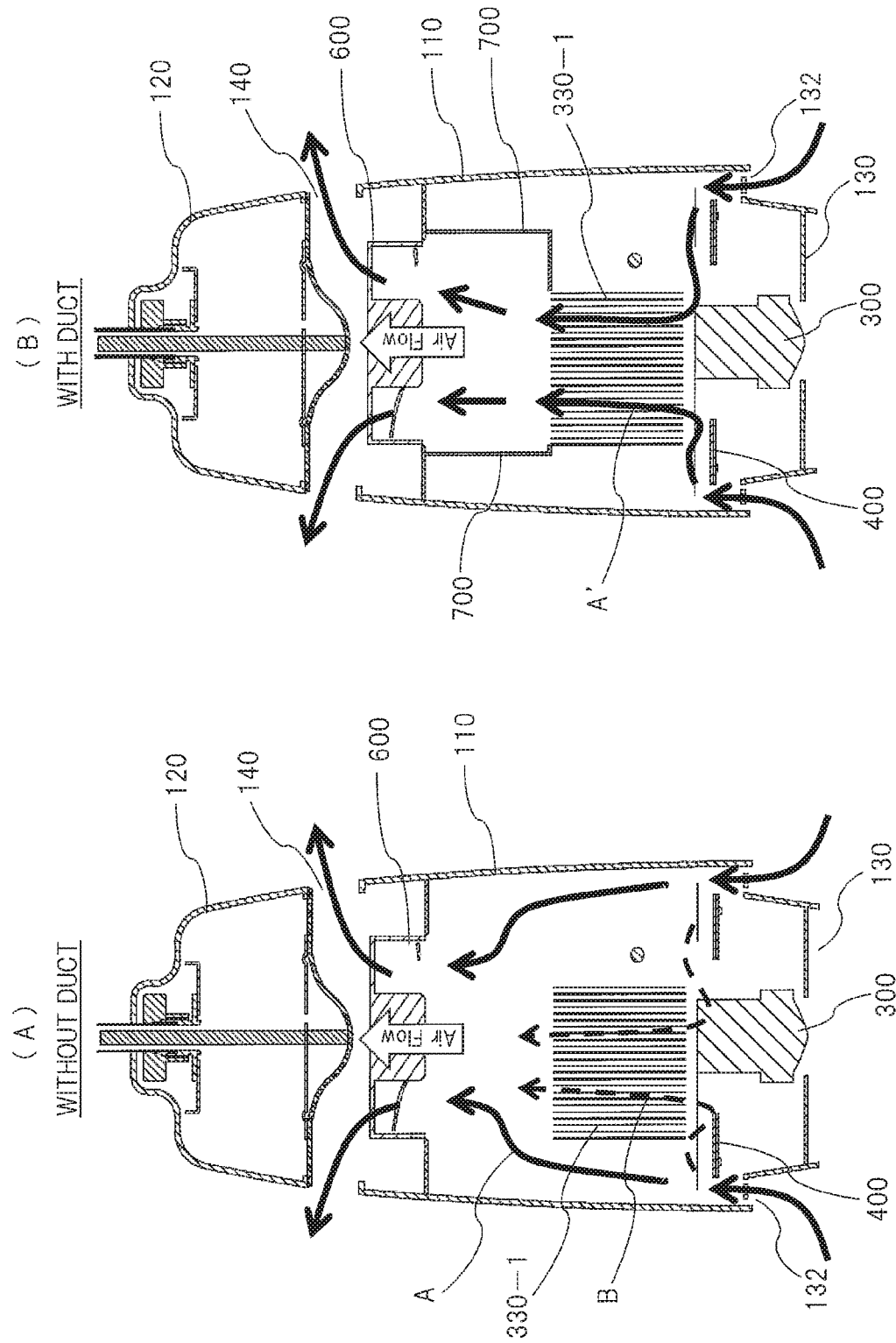
Figure 9:
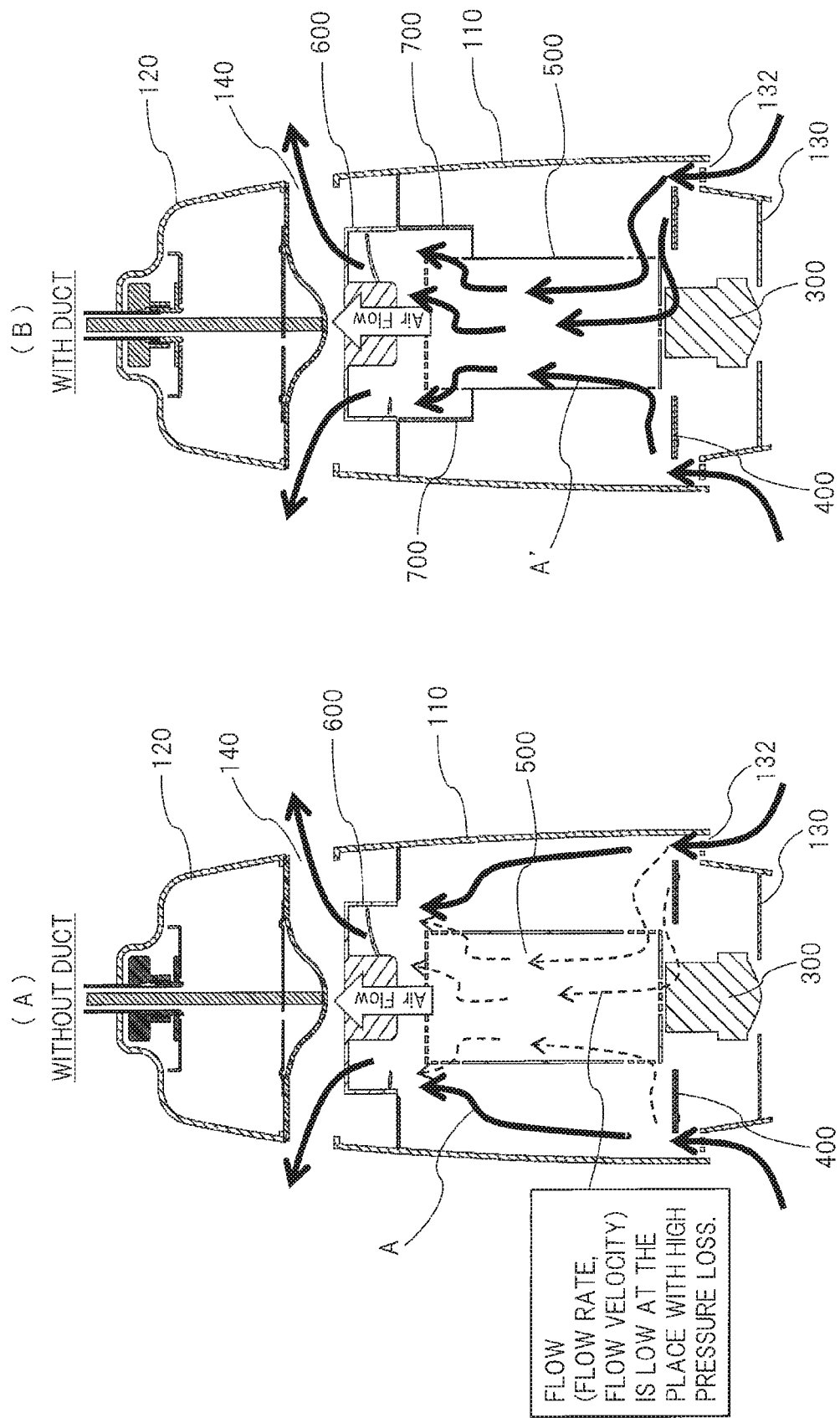
Figure 10:
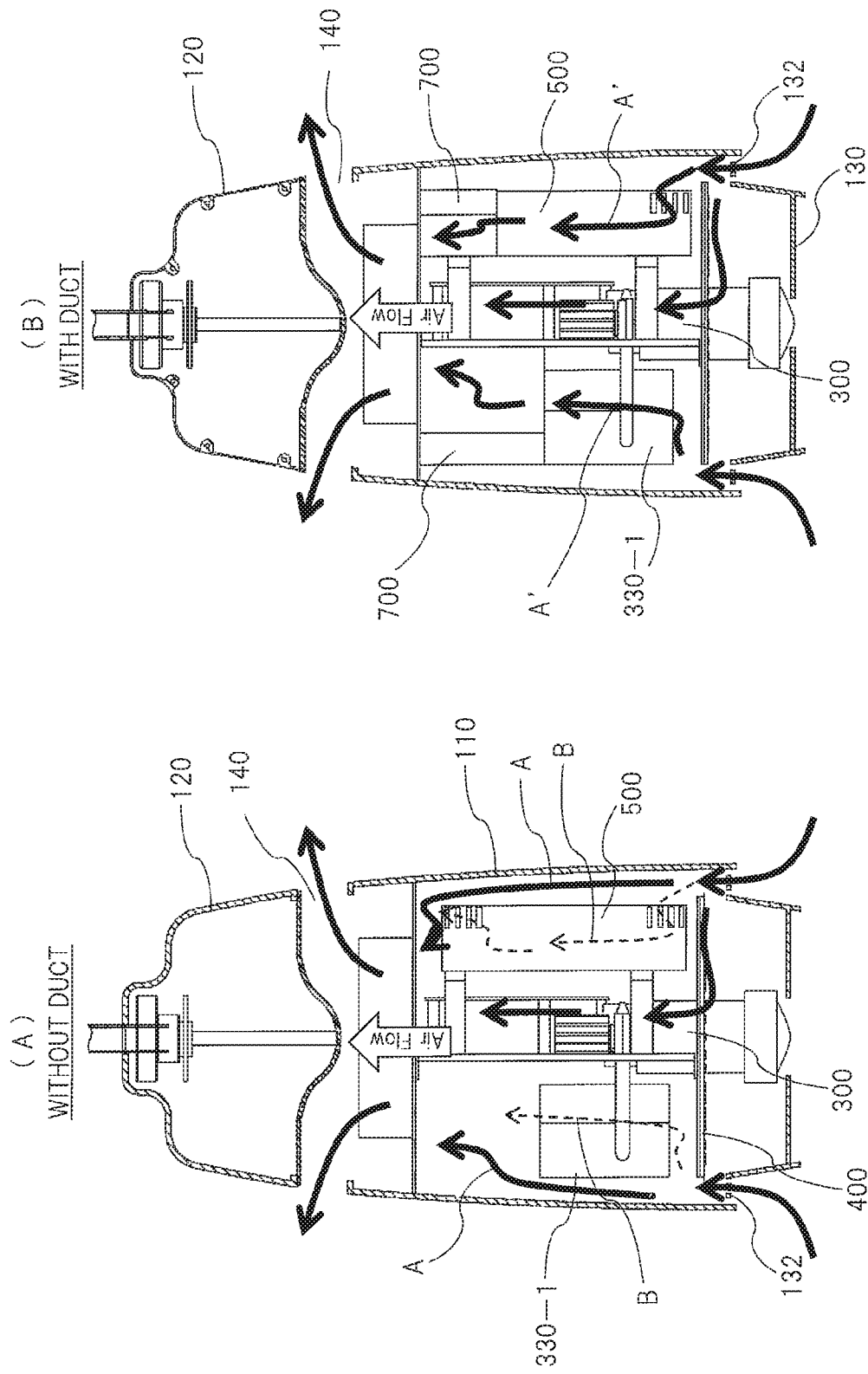
Figure 11:
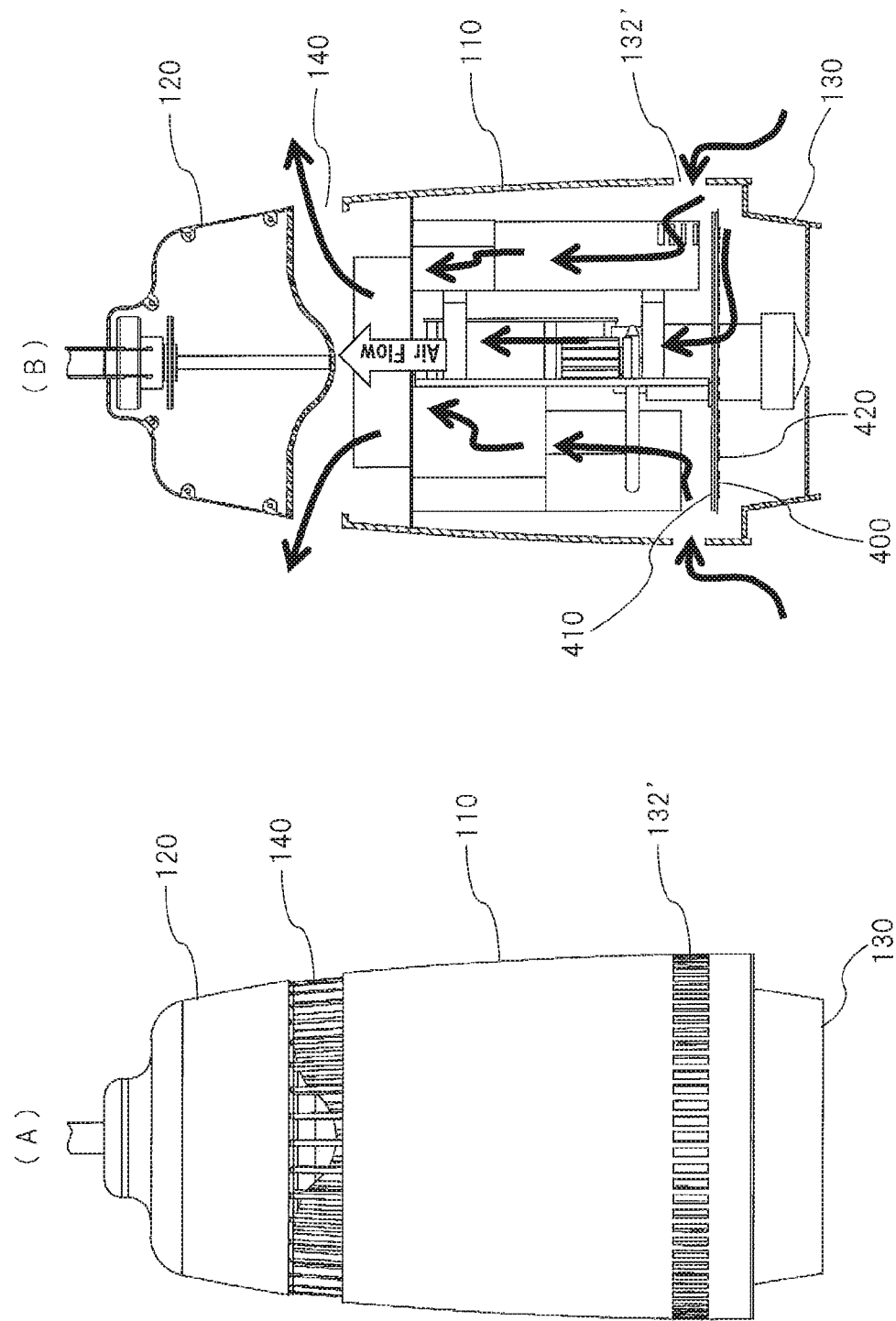

FIG. 1 is a perspective view showing an appearance configuration of a lighting apparatus having an image projecting function according an embodiment of the present invention together with its use environment;

FIG. 2(A) and FIG. 2(B) are a side view and a bottom view showing the appearance configuration of the lighting apparatus having an image projecting function;

FIG. 3 is a cross-sectional view showing an internal configuration of the lighting apparatus in detail;

FIG. 4(A) and FIG. 4(B) are an overall perspective view of the lighting apparatus in a state where a case and an illumination cover of the lighting apparatus are eliminated and a development view thereof;

FIG. 5(A), FIG. 5(B), FIG. 5(C), and FIG. 5(D) are a left side view, a top view, a right side view, and a front view of a PJ engine constituting the lighting apparatus;

FIG. 6(A) and FIG. 6(B) are perspective views showing the PJ engine seen from different directions;

FIG. 7 is a cross-sectional view showing an inner space of the case in an assembling structure of the lighting apparatus;

FIG. 8(A) and FIG. 8(B) are comparative views for describing an effect of a duct in a relation with a heat dissipating fin inside the case of the lighting apparatus;

FIG. 9(A) and FIG. 9(B) are comparative views for describing an effect of the duct in a relation with a power source inside the case of the lighting apparatus;

FIG. 10(A) and FIG. 10(B) are comparative views for describing an effect of the duct in a relation with other configurations inside the case of the lighting apparatus; and FIG. 11(A) and FIG. 11(B) are a side view and a bottom view showing an appearance configuration of a lighting apparatus having an image projecting function according to another embodiment of the present invention.

DETAILED DESCRIPTION OF PREFERRED EMBODIMENTS

Hereinafter, embodiments of the present invention will be described in detail with reference to the accompanying drawings.

First, FIG. 1 shows an appearance configuration of a lighting apparatus having an image projecting function according to one embodiment of the present invention. In particular, FIG. 1 shows a lighting apparatus having an image projecting function in which an image projecting function is installed in a so-called pendant-type lighting apparatus attached in a form of being suspended from a ceiling surface. However, the present invention can be applied not only to this type of lighting apparatus but also to a so-called ceiling-type lighting apparatus attached to a ceiling surface as described later. It is also possible to apply the present invention to a lighting apparatus mounted on a wall surface.

As can be seen from this figure, a lighting apparatus 10 having an image projecting function is attached in use to a wall surface, a ceiling surface 50 or the like constituting a space such as a kitchen, a dining room, a living room or an office. More specifically, as shown in FIG. 1, the apparatus is installed at a predetermined height above a table or desk 60 or the like arranged in a room or is installed integrally with the ceiling surface. This lighting apparatus 10 having an image projecting function is a lighting apparatus having both an illuminating function of emitting illumination light onto an upper surface of a table or a desk (see illumination light region 2 in FIG. 1) and an image projecting function of projecting and displaying various images onto the upper surface (display surface or projection surface) 61 of the table or desk 60 (see image projecting region 1 in FIG. 1). Note that a reference character 40 in FIG. 1 indicates a power source cable for holding the pendant-type lighting apparatus 10 in a suspended state at a desired position from the ceiling surface and supplying necessary power thereto.

A horizontal surface table, a desk or the like onto which a user desires to project an image by the image projecting function is highly likely to be an object to be illuminated by the illuminating function in such a case where the lighting apparatus is used without using the image projecting function. Therefore, a region onto which an image is projected by the image projecting function is desirably overlapped at least partly with an illumination range of the illumination light of the illuminating function.

Also, the lighting apparatus having an image projecting function is desirably configured to include a controller such that the illumination light emitted by the illuminating function and the image projected by the image projecting function can be respectively turned ON and OFF. Note that, in this embodiment, a user performs such an operation via an operation panel 70 attached to the wall surface.

FIG. 2(A) and FIG. 2(B) are a side view and a bottom view showing the appearance configuration of the lighting apparatus 10 having an image projecting function shown FIG. 1. As can be seen from these figures, the lighting apparatus 10 has an illumination LED and a small-sized projector (hereinafter, referred to as "PJ engine") to be described later installed in a housing 100 that covers an outer periphery. Note that the housing 100 is made up of, for example, a substantially cylindrical case 110 formed by resin molding or the like, a substantially cylindrical or conical case cap 120 attached to an upper side of the case, and an illumination cover 130 which is attached so as to cover a lower opening of the case and includes a diffusion plate of illumination light. A surface of the illumination cover 130 constituting the lower surface of the housing 100 may be configured as the diffusion plate that diffuses the illumination light emitted from inside of the housing 100. Alternatively, the whole of the illumination cover 130 may be configured as the diffusion plate that diffuses the illumination light emitted from inside of the housing 100.

Further, an air outlet 140 is formed between the case 110 and the case cap 120, and a plurality of guide plates or louvers may be provided in the air outlet as shown in the figure. These guide plates or louvers may be disposed so as to be inclined such that the inside thereof cannot be seen. At this time, in particular, it would be possible to prevent an increase in pressure loss by attaching the guide plates or louvers so as to be inclined along a rotation direction of a fan of a fan unit 600 described below.

Also, as shown in FIG. 2(B), an opening 131 through which projection light from the PJ engine passes is formed at a substantially center portion of the illumination cover 130, and a pane-shaped air intake 132 is formed in an outer edge portion of the illumination cover 130. Namely, in this embodiment, the air intake 132 is provided at a stepped portion between the case 110 and the illumination cover 130. Thus, for example, air in the room is taken into the lighting apparatus 10 from below, and is exhausted from an upper portion of the lighting apparatus 10 to the outside after having taken (cooled) the heat from the heating element inside. Further, the case 110 and the illumination cover 130 are configured to be easily attachable and detachable to and from the case cap 120 by a hook mechanism (not shown) or the like.

Subsequently, FIG. 3 shows a cross section of the lighting apparatus 10, and FIGS. 4(A) and 4(B) show an overall perspective view of the lighting apparatus 10 in a state where the case 110 and the illumination cover 130 are eliminated and a development view thereof.

As can be seen from there figures, a chassis 200 mainly constituting a base frame is disposed inside the case 110 in the vertical direction, and the main structures and components of the lighting apparatus 10 are fixed to the chassis 200. Namely, the PJ engine 300 to be described later in detail is mounted on one surface of the chassis 200, and a so-called illumination LED 400 in which an LED substrate 420 formed in an annular shape is overlaid on a surface of a heat dissipating plate 410 also formed in an annular shape and a plurality of illumination LEDs are arrayed on a surface of the substrate is horizontally attached at a lower end of the chassis 200. Light-emitting elements for the illumination LED serve as the illumination light source of the lighting apparatus of this embodiment.

Also, a plurality of (four, in this embodiment) rods 210 are planted on a surface of the chassis 200, and a control board 240 is attached to an upper end of each rod. In addition, a power source 500 is attached via a pair of substantially U-shaped integrally-formed protruding portions 230.

Further, a fan bracket 610 made of, for example, a disc-shaped metal plate is horizontally attached to an upper end of the chassis 200, and a fan unit 600 which is an air blower composed of, for example, an axial fan and an electric motor is attached to an upper surface of the fan bracket. The fan may be attached to a lower surface of the fan bracket 610 depending on configuration. Note that a plurality of rod-shaped support members 611 extend upward from the disc-shaped fan bracket 610 and are fixed to a part of the case cap 120. Namely, according to the configuration described above, main structures of the lighting apparatus 10 are integrally assembled with the case cap 120 via the chassis 200 described above. Note that an exhaust cover 121 is attached to a lower end of the case cap 120, so that the air flow from the fan unit 600 is directed toward the air outlet 140 formed on an outer periphery of an upper portion of the case 110. In addition, a reference character 700 in the figure indicates a so-called duct that is a member for defining the flow of cooling air inside the lighting apparatus 10.

Figure 5:
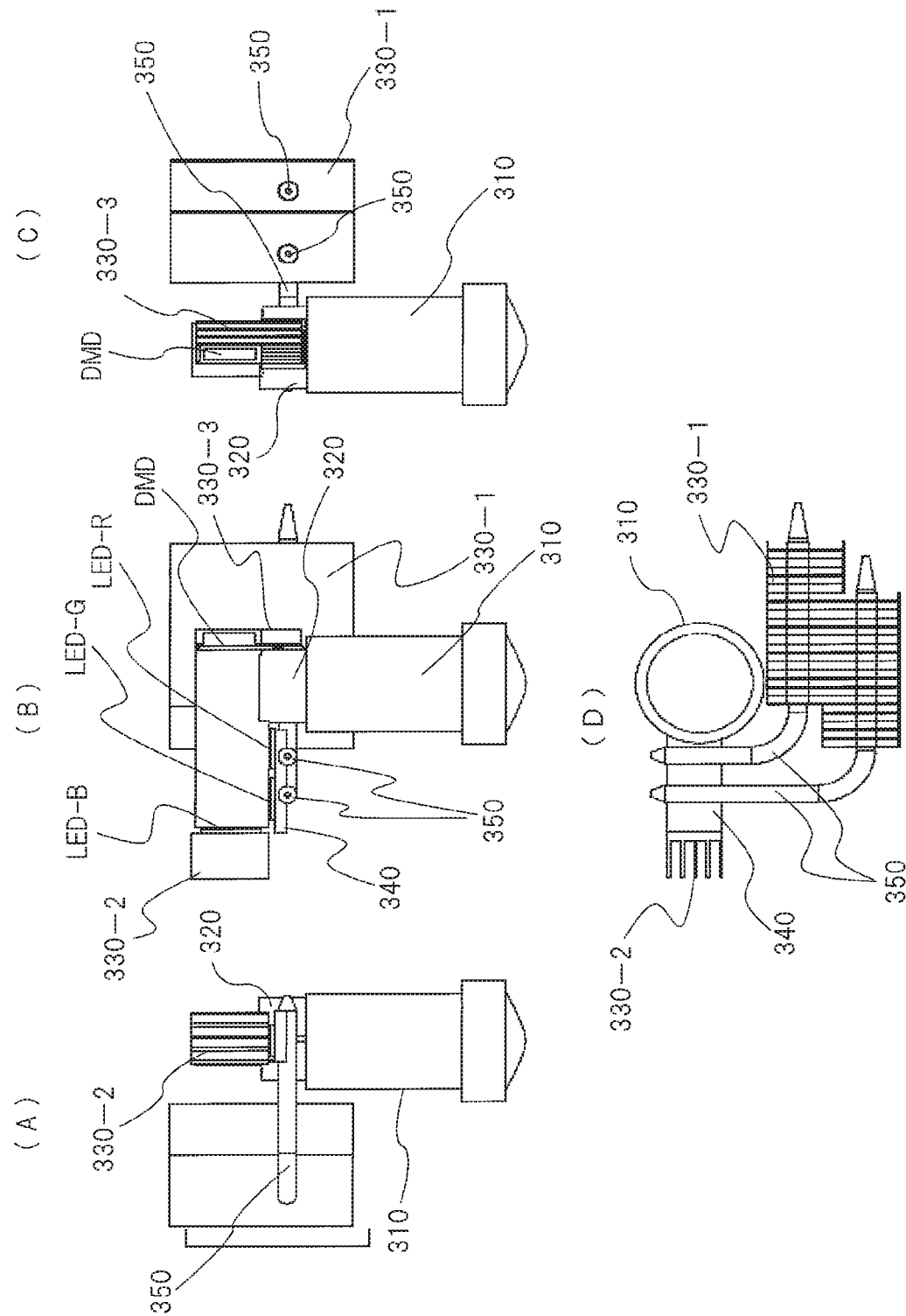
Figure 6:
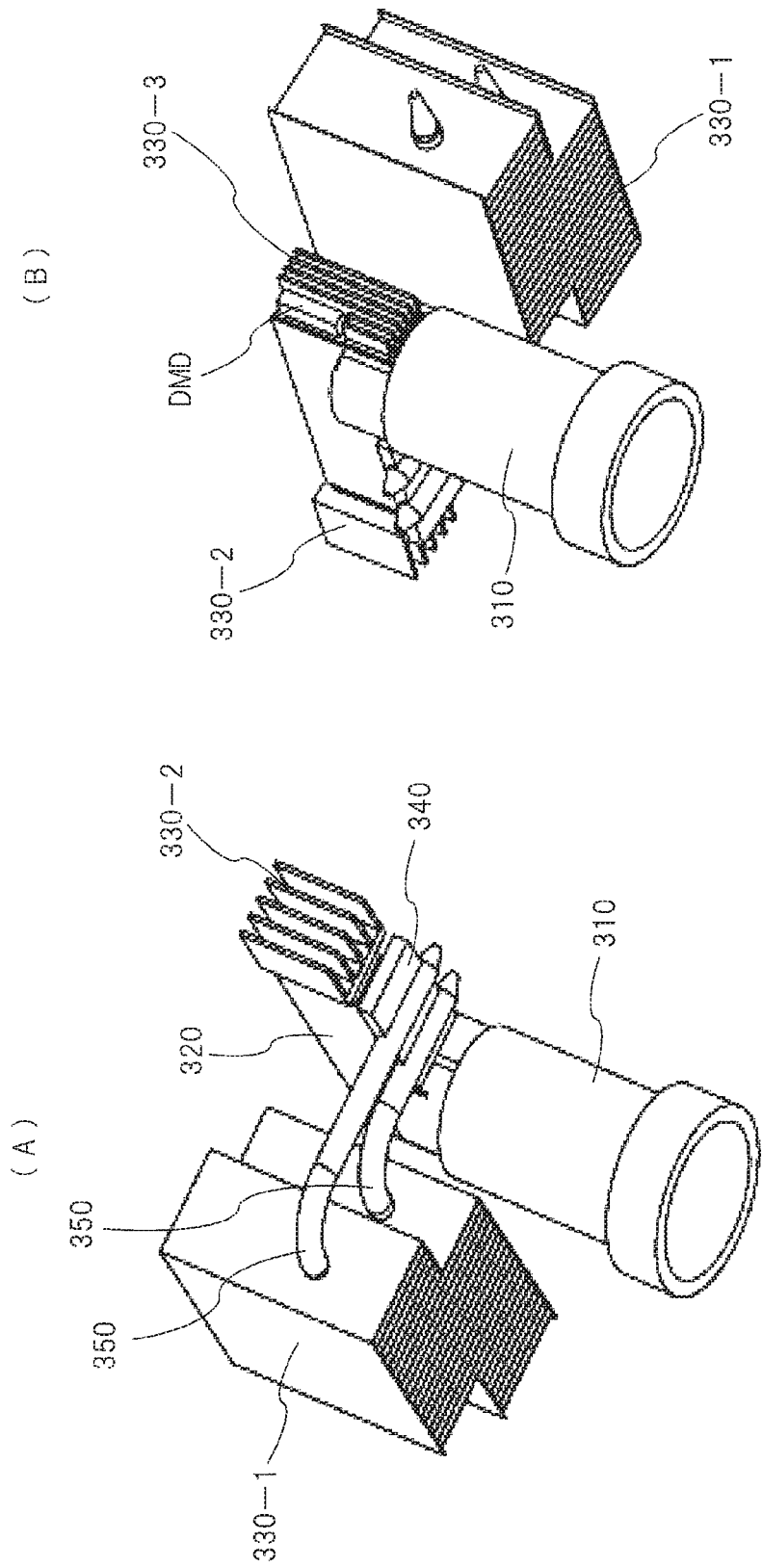

Here, a structure of the PJ engine 300 will be described in detail with reference to FIG. 5 and FIG. 6. Note that FIG. 5(A), FIG. 5(B), FIG. 5(C), and FIG. 5(D) are a left side view, a top view, a right side view, and a front view of the PJ engine, respectively, and FIG. 6(A) and FIG. 6(B) are perspective views showing the PJ engine seen from different directions.

In these figures, the PJ engine 300 is provided with a component including a light source (for example, halogen lamp or LED) and an imaging device (for example, DMD (Digital Micromirror Device)) which need to be cooled due to heat generation (hereinafter, collectively referred to as "heat source part 320") together with an optical unit 310 including a projection lens and others. In the configuration of this embodiment, a blue LED (LED-B), a green LED (LED-G) and a red LED (LED-R) as the light source for the projector engine and the DMD as the imaging device are provided. In addition, a plurality of heat dissipating fins 330-1, 330-2 and 330-3 for heat dissipation are attached to the heat source part 320. Further, to a heat source part with a large heat generation amount (for example, LED-G) and a heat source part with a severe cooling requirement due to its characteristics (for example, LED-R), a heat receiving plate 340 and a heat pipe 350 for improving the cooling efficiency by transporting their heat to the heat dissipating fins are provided.

Then, with reference to FIG. 3 and FIG. 4 again, the PJ engine 300 is also mounted similarly on the chassis 200 disposed in the vertical direction. In the present invention, the assembling structure described above makes it possible to improve the assembling property of the apparatus and the relative positional accuracy after each component is mounted.

Also, in the assembling structure described above, as shown in FIG. 7, an inner space of the case 110 is divided into two regions such as a first region and a second region by the chassis 200. The chassis 200 has a function of adjusting the flow of the cooling air flowing upward from below in the first region and the second region inside the housing, which makes it possible to suppress the mutual thermal influence between the two regions.

Further, efficient cooling is possible because of the use of the above-described heat pipe 350, heat dissipating fins 330-1, 330-2 and 330-3 and others. For example, a component with a large heat generation amount (heat generation density) disposed in the second region (for example, LED light source of the PJ engine 300 or others) is configured to transport a part of its heat by the heat pipe 350 to the heat dissipating fin 330-1 disposed in the first region where a larger heat dissipating area can be secured, so that efficient cooling can be achieved. Namely, the efficient cooling can be achieved by disposing the heat dissipating fins 330-1, 330-2 and 330-3 so as to be optimally distributed in the first region and the second region divided by the chassis 200. For example, when the first region and the second region have almost equal cross-sectional area, the heat generation amount in each of the regions is made almost equal to each other.

Further, efficient cooling capability can be obtained by making the opening amount of the air intake 132 of the illumination cover 130 for each region almost equal to each other.

Also, by disposing the duct 700 between the fan attached to the chassis 200 and the heat dissipating part on the air-intake side by the fan, the air flowing inside the case 110 can be controlled to flow efficiently to the heat dissipating fin 330-1. In the embodiment described above, sufficient cooling air is secured to the power source 500 similarly by providing the duct 700.

In addition, since ventilation convection by the fan unit 600 is generated as a whole in the portion other than the duct 700, components with small heat generation amount and components with high heat dissipating efficiency can also be cooled sufficiently by the optimization of the layout in the inner space of the case 110. Note that the air outlet 140 is formed between the upper portion of the case 110 and the case cap 120.

Subsequently, the effect of the duct 700 described above will be described below with reference to the drawings. First, in FIG. 8(A) and FIG. 8(B), the effect of the duct 700 in a relation with the heat dissipating fin 330-1 is particularly shown by comparing the case where the duct is not provided (FIG. 8(A) "WITHOUT DUCT") and the case where the duct is provided (FIG. 8(B) "WITH DUCT"). Also, in these figures, thick arrows indicate the flow of air with high flow velocity and dotted-line arrows indicate the flow of air with low flow velocity, respectively.

With the internal configuration of the lighting apparatus 10 having an image projecting function according to the present invention described above, as can be seen from the comparison of these figures, since the air is sucked from the air intake 132 in the lower portion of the case 110 and passes through the internal space thereof, and is then exhausted from the air outlet 140 in the upper portion by the fan unit 600 installed in an upper portion inside the case 110, it is possible to efficiently form the flow of the external air for cooling in the apparatus.

However, as can be seen from FIG. 8(A), when the duct is not provided, the cooling air denoted by the reference character A in the figure tends to flow through the place with a low pressure loss and thus flows while bypassing the heat dissipating fin 330-1 with a high pressure loss, so that the flow velocity between fins decreases at a place with a high pressure loss inside the heat dissipating fin 330-1 as denoted by the reference character B in the figure and the flow velocity at the place where cooling is unnecessary increases as denoted by the reference character A.

On the other hand, when the duct 700 is provided, as can be seen from FIG. 8(B), since the flow path of the air flow is restricted and the direction thereof is controlled by the duct, the air flow with high flow velocity can be obtained inside the heat dissipating film 330-1 where the high cooling effect is required as denoted by the reference character A' in the figure.

Next, the effect of the duct 700 described above in a relation with the power source 500 will be described with reference to FIG. 9(A) and FIG. 9(B). Also in these figures, the effect of the duct 700 is shown by comparing the case where the duct is not provided (FIG. 9(A) "WITHOUT DUCT") and the case where the duct is provided (FIG. 9(B) "WITH DUCT"), and thick arrows indicate the flow of air with high flow velocity and dotted-line arrows indicate the flow of air with low flow velocity, respectively.

Also in this case, when the duct is not provided (see FIG. 9(A)), the cooling air denoted by the reference character A in the figure tends to flow through the place with a low pressure loss and thus flows while bypassing the power source 500 with a high pressure loss, so that the flow velocity inside the power source 500 decreases as denoted by the reference character B in the figure and the flow velocity at the place where cooling is unnecessary increases as denoted by the reference character A. On the other hand, it can be understood that when the duct 700 is provided (FIG. 9(B)), the air flow with high flow velocity can be obtained even in the power source 500.

Further, the overall effect of the duct 700 in a relation with the internal configuration of the lighting apparatus 10 will be described with reference to FIG. 10(A) and FIG. 10(B). Also in these figures, the effect of the duct 700 is similarly shown by comparing the case where the duct is not provided (FIG. 10(A) "WITHOUT DUCT") and the case where the duct is provided (FIG. 10(B) "WITH DUCT"), and thick arrows indicate the flow of air with high flow velocity and dotted-line arrows indicate the flow of air with low flow velocity, respectively.

Also in this case, when the duct is not provided (see FIG. 10(A)), the cooling air denoted by the reference character A in the figure tends to flow through the place with a low pressure loss and thus flows while bypassing the place with a high pressure loss in the same manner as described above, so that the flow velocity in a part of the air flow decreases as denoted by the reference character B in the figure. On the other hand, it can be understood that when the duct 700 is provided (FIG. 10(B)), the air flow with high flow velocity can be obtained over the internal configuration.

As described above in detail, with the assembling structure of the lighting apparatus 10 having an image projecting function according to the present invention, the fan unit 600 is attached to the upper portion inside the case 110, and the air taken in from the air intake 132 in the lower portion of the case 110 can exert a cooling effect on the heat source part 320 (for example, the PJ engine 300, the power source 500, the control board 240, the illumination LED 400 and others) which is the component including the heat source disposed below the fan unit 600 inside the case 110 by the operation of the fan unit 600.

Note that, since the fan unit 600 is disposed in the upper portion inside the case 110, a fan unit having a comparatively large size and a high air volume can be adopted, so that it is possible to exert the sufficient cooling effect to the component including the heat source. At that time, since it is only necessary to acquire a desired flow velocity, it is possible to reduce the noise of the apparatus by decreasing the rotation speed of the fan for some situations. Further, by providing the air outlet 140 on the side surface of the housing, it is possible to prevent deterioration of the reliability of the apparatus due to invasion of dust and water droplets from the ceiling side without interfering with the suspension fixture of the lighting apparatus provided in the upper portion.

In addition, since the air intake 132 provided on the circumference of the illumination cover 130 is formed above the diffusion surface on the lower surface of the illumination cover 130 and on the outer side than the LED disposed on the outermost periphery among the LEDs mounted on the LED substrate 420, the user does not directly see the LED light source when the user looks up the lighting apparatus from below, which exerts the effect of greatly reducing the load on the eyes of the user.

Further, in the structure of the embodiment described above, the case 110 and the illumination cover 130 are configured to be easily detached from the case cap 120, and as can be seen from, for example, FIG. 4, various components such as the PJ engine 300 which is a component including the heat source, the heat dissipating fins 330-1, 330-2 and 330-3 for the PJ engine, the power source 500, the control board 240 and the illumination LED 400 are attached to the chassis 200 disposed in the vertical direction inside the case 110. Accordingly, since the overall internal structure is exposed by detaching the case 110 and the illumination cover 130, the assembly of the apparatus is easy, and furthermore, it also contributes to improvement of maintenance property such as easy replacement of components even at the time of repair.

Subsequently, a lighting apparatus having an image projecting function according to another embodiment of the present invention will be described with reference to FIG. 11(A) and FIG. 11(B). Note that FIG. 11(A) is a side view showing an appearance configuration of a lighting apparatus and FIG. 11(B) is an overall cross-sectional view of the lighting apparatus across a vertical direction.

The lighting apparatus according to the other embodiment is different from the lighting apparatus 10 described above in that an air intake 132' is not formed in apart of the illumination cover 130, but is formed in a lower portion of a side surface (outer peripheral surface) of the case 110. Note that, as can be seen particularly from FIG. 11(B), the air intake 132' is formed at a position slightly higher in a vertical direction than the illumination LED 400 in consideration of the leakage of the illumination light from the illumination LED 400 which is disposed horizontally and is configured by overlaying the LED substrate 420 formed in an annular shape on a surface of the heat dissipating plate 410 formed in an annular shape and arraying a plurality of illumination LEDs on the substrate. However, if a light shielding wall is provided, there is no problem even when the air intake 132' is formed at a lower position.

Note that the flow of the external air inside the case 110 in the internal configuration described above is also shown by the thick arrows indicating the air flow with high flow velocity in the same manner as described above, and it can be understood that the air flow with high flow velocity and large flow rate for achieving the sufficient cooling effect can be obtained. For example, the air intake 132' is more specifically formed of vertically elongated openings (gaps) between a plurality of louvers.

With the configuration according to the other embodiment described above, in other words, the formation position of the air intake 132', it is possible to prevent the matter concerned at the time of taking air, that is, the situation in which dusts in the air adhere to the air intake and drop off. In addition, it is possible to achieve the sufficient cooling to the illumination LED 420 by setting the formation position of the air intake 132' to be close to the illumination LED 420, or a heat dissipating fin may be attached to the surface of the heat dissipating plate 410 constituting the illumination LED 400 as needed though not illustrated here.

Further, when the air intake 132' described above is disposed in the vicinity of the illumination LED 400, the leakage of the illumination light from the openings (gaps) between the louvers is conceivable. Thus, in such a case, measures such as the adjustment of the position relative to the illumination LED 400 (for example, moved upward) or the installation of the light shielding wall though not illustrated here are possible.

In the foregoing, the lighting apparatus having an image projecting function according to various embodiments of the present invention has been described. However, the present invention is not limited to the embodiments described above and includes various modifications. For example, the embodiments above have described the overall system in detail in order to make the present invention easily understood, and the present invention is not always limited to the embodiment including all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

EXPLANATION OF REFERENCE CHARACTERS

10 . . . lighting apparatus, 110 . . . case, 120 . . . case cap, 130 . . . illumination cover, 140 . . . air outlet, 200 . . . chassis, 300 . . . PJ engine, 330 . . . heat dissipating fin, 340 . . . heat receiving plate, 350 . . . heat pipe, 400 . . . illumination LED, 600 . . . fan unit, 700 . . . duct

The invention claimed is:

1. A lighting apparatus which is held in a state of being suspended from a mounting bracket fixed to a ceiling surface or a wall surface and emits illumination light, the lighting apparatus comprising:
   an illumination light source for generating the illumination light disposed inside a housing;
   a projector disposed in an inner space of the housing and configured to project an image onto a projection surface; and
   a fan disposed in an upper portion inside the housing,
   wherein an air intake and an air outlet are formed at such positions in the housing that air flow generated by the fan is sucked from a lower portion of the housing, passes upward through a vicinity of the illumination light source and the projector, and is exhausted from the upper portion of the housing,
   wherein a chassis is disposed inside the housing in a vertical direction, and
   wherein the projector is mounted in the chassis and at least the illumination light source is attached to a part of the chassis.

2. The lighting apparatus according to claim 1,
   wherein a power source of the projector and a heat dissipating part for dissipating heat of a projector light source for the projector are disposed in different spaces of a plurality of spaces divided by the chassis disposed inside the housing in the vertical direction.

3. The lighting apparatus according to claim 2,
   wherein the fan is disposed above the plurality of spaces,
   wherein the power source of the projector and a first duct for controlling cooling air of the power source are disposed in a first space of the plurality of spaces, and
   wherein the heat dissipating part for dissipating heat of the projector light source for the projector and a second duct for controlling cooling air of the heat dissipating part are disposed in a second space of the plurality of spaces.

4. The lighting apparatus according to claim 2,
   wherein the power source of the projector supplies power to the projector and supplies power also to the illumination light source.

5. The lighting apparatus according to claim 1,
   wherein a diffusion plate configured to diffuse the illumination light from the illumination light source is disposed on a lower surface of the housing, and
   wherein the air intake is provided at a position above the diffusion plate or provided at a position on a side surface of the housing above the diffusion plate.

6. The lighting apparatus according to claim 1,
   wherein the air intake is provided at a position on a side surface of the housing above the illumination light source attached to the chassis.

7. The lighting apparatus according to claim 1,
   wherein a diffusion plate configured to diffuse the illumination light from the illumination light source is disposed on a lower surface of the housing, and
   wherein the air intake is provided on a plane disposed at a position above the diffusion plate, and is disposed below a plane on which the illumination light source is installed and on an outer periphery than a light-emitting surface of the illumination light source.

8. A lighting apparatus which is held in a state of being suspended from a mounting bracket fixed to a ceiling surface or a wall surface and emits illumination light, the lighting apparatus comprising:
   an illumination light source for generating the illumination light disposed inside a housing;
   a projector disposed in an inner space of the housing and configured to project an image onto a projection surface; and
   a fan disposed in an upper portion inside the housing,
   wherein an air intake and an air outlet are formed at such positions in the housing that air flow generated by the fan is sucked from a lower portion of the housing, passes upward through a vicinity of the illumination light source and the projector, and is exhausted from the upper portion of the housing,
   wherein a diffusion plate configured to diffuse the illumination light from the illumination light source is disposed on a lower surface of the housing, and
   wherein the air intake is provided on a plane disposed at a position above the diffusion plate, and is disposed below a plane on which the illumination light source is installed and on an outer periphery than a light-emitting surface of the illumination light source.

9. The lighting apparatus according to claim 8,
   wherein a power source of the projector and a heat dissipating part for dissipating heat of a projector light source for the projector are disposed in different spaces of a plurality of spaces divided by a chassis disposed inside the housing in a vertical direction.

10. The lighting apparatus according to claim 9,
    wherein the fan is disposed above the plurality of spaces,
    wherein the power source of the projector and a first duct for controlling cooling air of the power source are disposed in a first space of the plurality of spaces, and
    wherein the heat dissipating part for dissipating heat of the projector light source for the projector and a second duct for controlling cooling air of the heat dissipating part are disposed in a second space of the plurality of spaces.

11. The lighting apparatus according to claim 9,
wherein the power source of the projector supplies power to the projector and supplies power also to the illumination light source.

12. A lighting apparatus which is held in a state of being suspended from a mounting bracket fixed to a ceiling surface or a wall surface and emits illumination light, the lighting apparatus comprising:
an illumination light source for generating the illumination light disposed inside a housing;
a projector disposed in an inner space of the housing and configured to project an image onto a projection surface; and
a fan disposed in an upper portion inside the housing,
wherein an air intake and an air outlet are formed at such positions in the housing that air flow generated by the fan is sucked from a lower portion of the housing, passes upward through a vicinity of the illumination light source and the projector, and is exhausted from the upper portion of the housing,
wherein a chassis is disposed inside the housing, and
wherein the air intake is provided at a position on a side surface of the housing above the illumination light source attached to the chassis.

13. The lighting apparatus according to claim 12,
wherein the chassis is disposed inside the housing in a vertical direction, and
wherein the projector is mounted in the chassis and at least the illumination light source is attached to a part of the chassis.

14. The lighting apparatus according to claim 13,
wherein a power source of the projector and a heat dissipating part for dissipating heat of a projector light source for the projector are disposed in different spaces of a plurality of spaces divided by the chassis disposed inside the housing in the vertical direction.

15. The lighting apparatus according to claim 14,
wherein the fan is disposed above the plurality of spaces,
wherein the power source of the projector and a first duct for controlling cooling air of the power source are disposed in a first space of the plurality of spaces, and
wherein the heat dissipating part for dissipating heat of the projector light source for the projector and a second duct for controlling cooling air of the heat dissipating part are disposed in a second space of the plurality of spaces.

16. The lighting apparatus according to claim 14,
wherein the power source of the projector supplies power to the projector and supplies power also to the illumination light source.

17. The lighting apparatus according to claim 12,
wherein a diffusion plate configured to diffuse the illumination light from the illumination light source is disposed on a lower surface of the housing, and
wherein the air intake is provided at a position above the diffusion plate or the position on the side surface of the housing where the air intake is provided is above the diffusion plate.

* * * * *